333,103,464
Patented Sept. 10, 1963

3,103,464
METHOD OF KILLING NEMATODES WITH HYDROCARBON MONOTHIOLS
John E. Larson and Stanley T. Ichikawa, Modesto, Calif., assignors to Shell Oil Company, New York, N.Y., a corporation of Delaware
No Drawing. Filed Aug. 17, 1960, Ser. No. 50,089
6 Claims. (Cl. 167—22)

This invention relates to a method for protecting living plants by destroying organisms which attack them. More particularly, this invention relates to a method for protecting living plants by killing nematodes which attack the roots of the plants and thereby improving the growth of the plant.

Commercial nursery practice involves to an ever-increasing extent the transplanting of living plants. Despite the use of the best known practices of husbandry, plants become infested with nematodes. Transplantation of these plants, including the soil in which they are growing, inevitably results in the spread of the nematode infestation. Some progress has been made in the development of soil fumigants which permit the destruction of the nematodes in situ in the soil in which the plants are growing. Use of these fumigants requires great care, however, to avoid injury to the growing plants, and even these fumigants have not proven to be entirely effective in destroying the nematodes which are present on the roots of the plants. Further, such fumigants do not ordinarily destroy cysts formed by female cyst-forming nematodes and containing the eggs of the nematodes. The infestation of nematodes can to some extent be diminished by washing all soil from the roots of the plants to be transplanted, but this method does not remove all of the nematodes, since many of their cysts remain in root angles, cracks or crevices in or between roots, and in galls, or other abnormalities in the roots caused by the attack of the nematodes. Since most States have strict quarantine regulations prohibiting importation and/or traffic within the state of plants which are infested with nematodes, infestation by nematodes sharply reduces the value of the plants, and may even prevent use of the plants.

There is, therefore, a great need for a method for destroying the nematodes which are present on the roots of living plants without injury to the plants. The standard which such a method would have to satisfy are very severe: the method must effectively destroy the nematodes, yet must not be phytotoxic to the plants being treated.

Just such a method now has been discovered. Briefly, the method comprises contacting the surfaces of the roots of plants which are infested by nematodes with a liquid composition containing at least one member of the group consisting of the hydrocarbon monothiols, such thiols containing one or more thio sulfur atoms bonding together aliphatic carbon atoms, and carboxylic acid esters of all of these thiols.

This method has been found to be effective for destroying nematodes present on plant roots without causing damage to the plants themselves. Further, it has the advantages that: very small amounts of the monothiols or their esters are required per plant; ordinarily, aqueous solutions or suspensions are employed; the technique and physical equipment required are both very simple, so that the method can readily be performed by unskilled persons, thus reducing the cost per plant treated. Based on present costs of the active materials and labor, this method effects the protection of plants at very low cost per plant.

Described in somewhat more detail, nematodes present on the roots of a living plant are destroyed by wetting the roots of the plants with a liquid composition containing a nematocidally effective but non-phytotoxic concentration of at least one member of the group consisting of the hydrocarbon monothiols, such thiols containing one or more thio sulfur atoms bonding together aliphatic carbon atoms, and carboxylic acid esters of all of these thiols, then planting the plants or shipping the plants for later planting. Ordinarily, the contact of the surface of the roots of the plant with the nematocide composition will be most conveniently and effectively attained by immersing the roots, preferably freed from at least most of the soil in which they are growing, in a mass of the nematocide composition so that the surfaces of the roots are thoroughly wetted by the composition. The roots then can be withdrawn from the mass of the composition and the plant planted. If desired, the plant's roots may be rinsed with water after the plant is removed from contact with the liquid composition, or the plant may be planted without any intervening rinse.

When plants which have been treated according to the method of this invention are planted in clean soil free from nematodes, a substantial improvement in growth occurs—as compared to plants infested with nematodes planted in the same kind of clean soil.

According to this invention, the compounds which have been found to have the unique combination of (a) the high activity against nematodes and (b) the low toxicity toward living plants which permits their use to protect living plants without harm to the plants are the hydrocarbon monothiols and such thiols containing from one to a plurality of thio sulfur (—S—) atoms bonding aliphatic carbon atoms, and the esters of such monothiols with carboxylic acids. The nematocidal materials employed in the method of this invention can be described by the generic formula:

R—S—R' wherein R represents a hydrocarbon group, or a hydrocarbon group containing one or more thio sulfur linkages bonding aliphatic carbon atoms, and R' represents a hydrogen atom or an acyl group of a carboxylic acid. Included in this class of compounds are the thiols themselves, and their esters with carboxylic acids.

The group, R, suitably is aliphatic, cyclic or mixed in configuration containing, for example, up to 20 carbon atoms, or even more. The aliphatic groups, R, suitably are of either straight-chain or branched-chain configuration, and may be saturated, olefinically unsaturated or acetylenically unsaturated. The cyclic groups suitably can be either alicyclic or aromatic. By mixed groups are those containing more than one type of configuration—that is, the mixed groups are for example the aliphatic-substituted aromatic groups, the aromatic-substituted aliphatic groups, aliphatic-substituted alicyclic groups, and the like. Preferably, the aromatic moiety is monocyclic—i.e., the phenyl structure. The group, R, suitably is hydrocarbon or hydrocarbon containing one or more thio sulfur (—S—) linkages between aliphatic carbon atoms. Thus the group, R, is always bonded to the sulfur atom of the —SH or —SR' moiety by a carbon atom. The group, R, thus can be an alkyl group, an alkylthioalkylene group, an alkenyl group, an alkylthioalkenylene group, an alkenylthioalkylene group, an alkynyl group, an alkadienyl group, the phenyl group, an alkyl-substituted phenyl group, a phenyl-substituted alkyl group, a phenylthioalkylene group, an alkyl group substituted by an alkyl-substituted phenyl group, a cycloalkyl group, a cycloalkenyl group, a cycloalkadienyl group, or the like. Preferred because of their effectiveness as pesticides are these compounds wherein the group, R, contains not more than 10 carbon atoms. The alkanethiols are readily available, and in many cases are therefore to be preferred.

In the esters, the group, R', is an acyl group of a carboxylic acid. By "acyl" is meant the radical derived from a carboxylic acid by removal of the hydroxyl group, the acid and the resulting acyl group containing, for example, up to 20 carbon atoms, or even more. Where the carboxylic acid has the formula $R^x$—C(O)—OH, the acyl radical has the formula $R^x$—C(O)—. Suitably the acyl radical may be that of a lower aliphatic mono- or polycarboxylic acid, that of an aryl mono- or polycarboxylic acid, or that of a mono- or polycarboxylic acid of mixed structure, as in the aralkyl acids, the alkaryl acids, and the like. When the group represented by $R^x$ is substituted by one or more non-hydrocarbon substituents, suitable substituents include halogen, the cyano radical, the nitro radical, the hydroxy radical, the mercapto radical, and the like.

Of the esters, those of lower molecular weight alkane carboxylic acids, for example the alkanoic acids of from one to ten carbon atoms, are preferred because of their ready availability and high nematocidal effectiveness.

Typical of these thiols and their esters are those wherein the group R is methyl, ethyl, n- or isopropyl, n-, sec- or tert-butyl, or like alkyl, or is allyl, methallyl, 2-butenyl, or like alkenyl, or is 2-propynyl, 2-butynyl, or like alkynyl, cyclopentyl, cyclohexyl, or like cycloalkyl, phenyl, benzyl, p-methylphenyl, and like aromatic and mixed groups.

Typical species of these thiols and their esters include: cyclohexanethiol, its acetate, propionate, benzoate, and butyrate, S-2-propynyl thioacetate, S-2-butenyl thioacetate, S-benzyl thioacetate, (methylthio)methanethiol, S-butyl thiobenzoate, 2-propene-1-thiol, 1-pentanethiol, S-allyl thioacetate, S-2-methylallyl thioacetate, 1-octanethiol, o-toluenethiol, p-toluenethiol, 1-pentanethiol, 1-hexanethiol, S-hexyl thioacetate, and the like.

These thiols and their esters, and methods for their preparation are well known, an excellent summary being set forth in the first two chapters of volume 1 of Reid, "Organic Chemistry of Bivalent Sulfur," Chemical Publishing Co., 1958.

The value of the method of this invention for destroying nematodes was demonstrated by the following tests.

Tomato plants were grown under uniform conditions in soil infested with nematodes, primarily *Meloidogyne incognita* (var. *acrita*). The infested plants then were removed from the soil, washed thoroughly and for 24 hours each was soaked in aqueous liquid composition containing the test chemical, then was removed, the roots rinsed with water and the plant planted in clean soil. About a month later, the plants were harvested and examined for any new infection and to determine if any damage had been done to the plant by the treatment. The observations were made, and the extent of control of nematodes estimated by experienced observers.

The following results were obtained:

| Compound | Concentration of compound in liquid composition which resulted in indicated control on nematodes (parts per million by weight of the liquid composition used). | | Damage to plants at concentration of compound used |
|---|---|---|---|
| | Concentration | Percent Control | |
| S-2-propynyl thioacetate | 250 | 75 | none. |
| S-2-butenyl thioacetate | 250 | 100 | none. |
| S-allylthioacetate | 750 | 100 | none. |
| S-cyclohexyl thioacetate | 250 | 62 | none. |
| (methylthio)methanethiol | 750 | 100 | none. |
| 2-propene-1-thiol | 250 | 48 | none. |
| 1-pentanethiol | 250 | 98 | none. |
| S-butyl thiobenzoate | 750 | 75 | none. |
| S-(3-allylthio)propyl thioacetate | 250 | 98 | slight. |

Other compounds which were observed to kill nematodes without observable damage to the plants were S-2-methylallyl thioacetate and S-benzyl thioacetate.

These nematocidal agents ordinarily are used in the form of an aqueous solution and/or suspension of appropriate strength, since the solution will be directly applied to the roots of the plant and since water is a solvent which will not injure the roots. Other solvents may be present or may be used, as desirable and convenient, but in all cases, care must be taken to insure that the solvent is one which is not phytotoxic.

In general, suitable solvents other than water are the essentially neutral oxygen-containing organic liquids, such as the alcohols, ketones and esters. In many cases, it will be found that the thiol or its ester will be more soluble in a mixture of a lower alcohol or ketone and water than in water alone, so that the use of such mixtures will be advantageous. As a general matter, liquid hydrocarbons are not suitable because the solutions and/or suspensions made up from them tend to be unduly phytotoxic.

Likewise, other materials may be present in the liquid composition, provided that they do not injure the plant roots. Thus, surface-active agents—emulsifiers, detergents or the like—may be added, or hormones, fertilizers, or other special purpose chemicals may be included to provide multi-purpose compositions.

The concentration of a particular one or ones of the nematocides to be used in the liquid composition employed to treat any given species of plant will depend upon several factors: the nematocide or nematocides used, the species of plant used—particularly from the standpoint of the character of its roots, which is to say, whether its roots are smooth or rough, fleshy or fibrous, tender or woody, the extent to which they have been modified by attack by the namatodes and the nature of those modifications—and the character of the organisms to be destroyed. The nematocides used in the process of this invention are effective nematocides at concentrations of as little as about 3 parts per million by weight of the composition. In the usual case, it will be found that a concentration in excess of about 800 parts per million by weight of the composition will not be required and therefore concentrations above this level preferably are not used. It will be appreciated that as in the case of any chemical which exhibits biocidal activity, injury to the roots of the plants can occur if a concentrated solution or suspension of a nematocide of the method of this invention is applied to those roots. The concentrations set out herein are those which the experimental evidence available show are effective nematocidal dosages which are not phytotoxic. Usually, a concentration of the nematocide of from about 10 to about 60 parts per million by weight of the composition will be found best, since at these concentrations nematodes are effectively destroyed and possibility of injury to the plant by the nematocide is minimized.

The plants are ordinarily most conveniently and effectively treated by simply contacting their roots with the liquid nematocide composition, and allowing them to remain in contact with the composition for the time required to effect destruction of the nematodes on the roots. The contact can be effected by drenching the soil surrounding the roots with the nematocide composition to wet the roots thoroughly with that composition. However, usually it will be found most convenient and effective to remove at least the major part of the soil surrounding the roots before those roots are contacted with the composition. Thus, in one aspect of the method of this invention, the infested plant is carefully removed from the soil, its roots immersed in the nematocide composition for the necessary time, then it is removed from contact with the composition and replanted, or prepared for shipment. In many cases it will be found preferable to rinse most of the soil from the roots of the plant before it is treated—i.e., the "bare root" plant is treated. Where the plant is to be packed for sale in "bare-root" condition, this aspect of the method of the invention is particularly convenient. In some cases, a contact period of as little as a few minutes—for example, 15 to 60 minutes—will be sufficient, while in other cases, primarily where access to the nematodes by the nematocide is difficult to obtain, as much as 36 to 48 hours contact time may be required. Ordinarily a contact time of from about 8 to about 24 hours will be sufficient. In some cases, it may be found convenient and/or desirable to immerse the entire plant in the nematocide composition.

Where the roots of the infested plants are immersed in a mass of the nematocide composition, the composition from which the plants have been removed may be reused, provided that the concentration of nematocide therein is sufficiently high, or provided that additional nematocide is added to attain the necessary concentration.

After removal from the nematocide composition, the plants may be planted, or packaged for shipment, without further treatment, or the roots of the plants may first be rinsed with water or other appropriate solvent to remove any excess of the composition remaining on the roots.

The method of the invention is effective in destroying the various parasitic nematodes which attack plant roots. By nematodes is meant those unsegmented roundworms of the class Nematoda, also known as eelworms, which customarily inhabit the soil and feed upon the roots of plants. Included are the cyst-forming nematodes of the genus Heterodera, the root knot nematodes of the genus Meloidogyne, the root-lesion nematodes of the genus Pratylenchus, and the citrus nematodes of the genus Tylenchulus, the sting nematodes of the genus Belonolaimus, and the plant-parasitic nematodes of such genera as Ditylenchus, Nacobbus, and the like.

We claim as our invention:

1. A method for protecting plants by destroying nematodes attacking their roots, said method comprising contacting the roots of said plants free from at least the major part of any soil surrounding them with a liquid composition containing, in a concentration toxic to nematodes present on such roots but substantially nontoxic with respect to said roots, at least one compound of the formula, R—S—R′, wherein R represents a radical of up to ten carbon atoms which is a member of the group consisting of hydrocarbon radicals and radicals containing only carbon, hydrogen and from one to a plurality of thio sulfur atoms bonding together aliphatic carbon atoms, and R′ represents a member of the group consisting of hydrogen and acyl radicals of unsubstituted carboxylic acids of up to 20 carbon atoms.

2. A method for protecting plants by destroying nematodes attacking their roots, said method comprising contacting the roots of said plants free from at least the major part of any soil surrounding them with a liquid composition containing, in concentration toxic to nematodes present on such roots but substantially nontoxic with respect to said roots, a compound of the formula, R—S—H, wherein R represents an aliphatic hydrocarbon radical of up to ten carbon atoms.

3. A method for protecting plants by destroying nematodes attacking their roots, said method comprising contacting the roots of said plants free from at least the major part of any soil surrounding them with a liquid composition containing, in a concentration toxic to nematodes present on such roots but substantially nontoxic with respect to said roots, a compound of the formula, R—S—R′, wherein R represents an aliphatic hydrocarbon radical of up to ten carbon atoms and R′ represents the acyl radical of an alkanoic acid of up to ten carbon atoms.

4. A method for protecting plants by destroying nematodes attacking their roots, said method comprising contacting the roots of said plants free from at least the major part of any soil surrounding them with a liquid composition containing, in a concentration toxic to nematodes present on such roots, but substantially nontoxic with respect to said roots, a compound of the formula, R—S—H, wherein R is an alkyl radical of up to ten carbon atoms.

5. A method for protecting plants by destroying nematodes attacking their roots, said method comprising contacting the roots of said plants free from at least the major part of any soil surrounding them with a liquid composition containing, in a concentration toxic to nematodes present on such roots, but substantially nontoxic with respect to said roots, a compound of the formula, R—S—R′, wherein R is an alkyl radical of up to 10 carbon atoms and R′ is the acyl radical of an alkanoic acid of up to ten carbon atoms.

6. A method for protecting plants by destroying nematodes attacking their roots, said method comprising contacting the roots of said plants free from at least the major part of any soil surrounding them with a liquid composition containing, in a concentration toxic to nematodes present on such roots, but substantially nontoxic with respect to said roots, a compound of the formula, R—S—R′, wherein R is an alkyl radical of up to 10 carbon atoms and R′ is the acyl group of benzoic acid.

References Cited in the file of this patent

UNITED STATES PATENTS

| | | |
|---|---|---|
| 2,719,170 | Harris | Sept. 27, 1955 |
| 2,864,739 | Scott et al. | Dec. 16, 1958 |
| 2,877,153 | Webb et al. | Mar. 10, 1959 |
| 2,917,429 | Scott et al. | Dec. 15, 1959 |
| 2,998,346 | Scott | Aug. 26, 1961 |
| 3,004,885 | Kosmin | Oct. 17, 1961 |